(12) United States Patent
Lee et al.

(10) Patent No.: US 11,901,526 B2
(45) Date of Patent: Feb. 13, 2024

(54) BATTERY MODULE COMPRISING TEMPERATURE SENSOR

(71) Applicant: SK On Co., Ltd., Seoul (KR)

(72) Inventors: Seung Hun Lee, Daejeon (KR); Hyeong Kwan Kang, Daejeon (KR); Kwan Yong Kim, Daejeon (KR); Sang Yeon Kim, Daejeon (KR); Dong Jin Shin, Daejeon (KR); Ung Ho Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 74 days.

(21) Appl. No.: 17/560,695

(22) Filed: Dec. 23, 2021

(65) Prior Publication Data
US 2022/0209321 A1    Jun. 30, 2022

(30) Foreign Application Priority Data

Dec. 29, 2020 (KR) .......................... 10-2020-0186217

(51) Int. Cl.
*H01M 50/211* (2021.01)
*H01M 10/48* (2006.01)
*H01M 50/507* (2021.01)

(52) U.S. Cl.
CPC ....... *H01M 10/486* (2013.01); *H01M 50/211* (2021.01); *H01M 50/507* (2021.01)

(58) Field of Classification Search
CPC . H01M 10/486; H01M 50/211; H01M 50/507
See application file for complete search history.

(56) References Cited

U.S. PATENT DOCUMENTS

| 2015/0214583 A1* | 7/2015 | Lim | H01M 10/486 |
| | | | 429/90 |
| 2018/0342775 A1* | 11/2018 | Sei | H01M 50/507 |

FOREIGN PATENT DOCUMENTS

| JP | 2012-038468 A | | 2/2012 |
| JP | 2020-043038 A | | 3/2020 |
| JP | 2020043038 | * | 3/2020 |
| KR | 10-2015-0089483 A | | 8/2015 |
| KR | 10-1917510 B1 | | 11/2018 |
| WO | 2019/049671 A1 | | 3/2019 |
| WO | WO2019049671 | * | 3/2019 |

OTHER PUBLICATIONS

WO20190496 MT (Year: 2019).*
JP 2020043038MT (Year: 2020).*
Extended European Search Report for European Patent Application No. 21216509.6 issued by the European Patent Office dated May 18, 2022.

* cited by examiner

*Primary Examiner* — Alexander Usyatinsky
(74) *Attorney, Agent, or Firm* — IP & T GROUP LLP (57) ABSTRACT

A battery module includes a cell stack including a plurality of battery cells stacked therein, a bus bar assembly coupled to a side of the cell stack, on which an electrode lead of the battery cell is disposed, and a sensing device coupled to the bus bar assembly and measuring a temperature of the battery cell. The bus bar assembly is coupled to the cell stack in a vertical direction, and the sensing device includes a temperature sensor disposed in close contact with the battery cell, and an elastic bracket pressing the temperature sensor toward the battery cell through elastic force.

20 Claims, 8 Drawing Sheets

BATTERY MODULE COMPRISING TEMPERATURE SENSOR

CROSS-REFERENCE TO RELATED APPLICATION

This application claims the benefit under 35 USC 119 (a) of Korean Patent Application No. 10-2020-0186217 filed on Dec. 29, 2020 in the Korean Intellectual Property Office, the entire disclosure of which is incorporated herein by reference for all purposes.

BACKGROUND

1. Field

The present disclosure relates to a battery module having a temperature sensor.

2. Description of Related Art

Unlike primary batteries, secondary batteries may be electrically charged and discharged, and may thus be applied to devices within various fields such as digital cameras, mobile phones, laptops, and hybrid vehicles. Examples of the secondary battery include a nickel-cadmium battery, a nickel-metal hydride battery, a nickel-hydrogen battery, a lithium secondary battery, and the like.

Among such secondary batteries, research into lithium secondary batteries having high energy density and discharge voltage is in progress. Recently, lithium secondary batteries have been used in the form of a module by connecting a plurality of flexible pouch-type battery cells.

The battery module may include a temperature sensor to measure the temperature of a battery cell. However, in the related art, there is a concern in that the reliability of temperature data may be deteriorated because the contact between the battery cell and the temperature sensor is poor.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

One aspect of the present disclosure is to provide a battery module having a temperature sensor firmly in contact with a battery cell.

According to another aspect of the present disclosure, a battery module includes a cell stack including a plurality of battery cells stacked therein; a bus bar assembly coupled to a side of the cell stack, on which an electrode lead of the battery cell is disposed; and a sensing device coupled to the bus bar assembly and measuring a temperature of the battery cell. The bus bar assembly is coupled to the cell stack in a vertical direction, and the sensing device includes a temperature sensor disposed in close contact with the battery cell, and an elastic bracket pressing the temperature sensor toward the battery cell through elastic force.

The elastic bracket may include a support member having a rod shape and having a first surface on which the temperature sensor is disposed; and a fixing portion fixing and fastening one end of the support member to the bus bar assembly in cantilever form.

The fixing portion may include a locking protrusion fitted into a coupling groove disposed in the bus bar assembly.

The elastic bracket further may include an elastic reinforcing portion disposed on a second surface of the support member, at least a portion of the elastic reinforcing portion being in contact with the bus bar assembly and elastically deformed to reinforce the elastic force of the support member.

The elastic reinforcing portion may include a bending portion extending in a curved shape from the second surface of the support member, and a contact portion extending from the bending portion and partially in contact with the bus bar assembly.

The elastic bracket may further include a locking protrusion protruding from the contact portion and inserted into the bus bar assembly.

The battery module may further include a circuitry coupled to the bus bar assembly; and a connection substrate disposed on one surface of the support member and electrically connecting the temperature sensor and the circuitry.

The sensing unit may be provided as a plurality of sensing units spaced apart from each other.

The bus bar assembly may include an insulating cover having a first slit into which the electrode lead is inserted; and a bus bar fastened to one surface of the insulating cover and having a second slit into which the electrode lead is also inserted.

The first slit and the second slit may be configured to be connected to externally through a lower portion of the bus bar assembly, and the electrode lead may be simultaneously insertable into the first slit and the second slit through the lower portion of the bus bar assembly.

The first slit may be provided as a plurality of first slits spaced apart from each other in parallel, and the elastic bracket may be disposed between the first slits and coupled to the insulating cover.

The battery cell may have an accommodating portion in which the electrode assembly is accommodated, and the temperature sensor may be disposed to contact one surface of the accommodating portion, on which the electrode lead is disposed.

When the bus bar assembly is coupled to the cell stack, the support member may be elastically deformed by the battery cell and is pressed toward the bus bar assembly.

The bus bar assembly may include a first bus bar assembly coupled to one side of the cell stack; a second bus bar assembly coupled to the other side of the cell stack; and a connection member connecting the first bus bar assembly and the second bus bar assembly. The first bus bar assembly and the second bus bar assembly may be simultaneously coupled to the cell stack.

At least one of the battery cells may include an accommodating portion containing electrolyte, and the temperature sensor is pressed against the accommodating portion.

During assembly of the battery module, the temperature sensor may slide along the curved section of the accommodating portion in order to provide an external force to the elastic bracket for pressing the temperature sensor toward the battery cell and into contact with the accommodating portion.

After assembly of the battery module, the temperature sensor may be pressed into contact with the battery cell without additional manufacturing steps to secure the temperature sensor in position.

According to another aspect of the present disclosure, a battery module temperature monitor includes a sensing device configured to be coupled to a bus bar assembly connected to a cell stack including a plurality of battery cells; a temperature sensor included with the sensing device; and an elastic bracket configured to be supported by the bus bar assembly and connected to the temperature sensor. At least one of the battery cells includes an accommodating portion containing electrolyte, and the temperature sensor when installed is pressed by the elastic member against the accommodating portion.

The temperature sensor may be configured to slide along a curved section of the accommodating portion during installation of the battery monitor in order to provide an external force to the elastic bracket for pressing the temperature sensor into contact with the accommodating portion.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

The following detailed description is provided to assist the reader in gaining an understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will will convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

Figure 1:
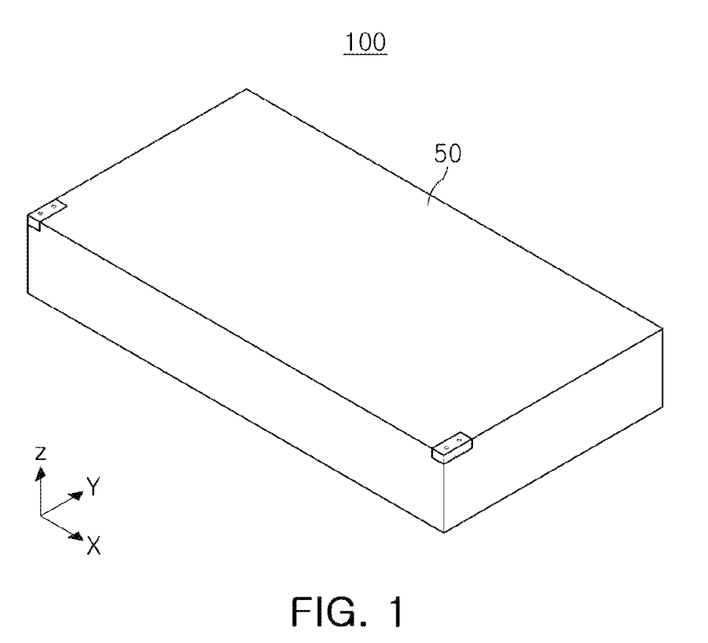
FIG. 1 is a perspective view illustrating a battery module according to an embodiment.

In addition, in the present specification, the vertical direction or the upward and downward directions refer to the Z-axis direction of FIG. 1, and the horizontal direction or the lateral direction refers to the X-axis direction.

Figure 2:
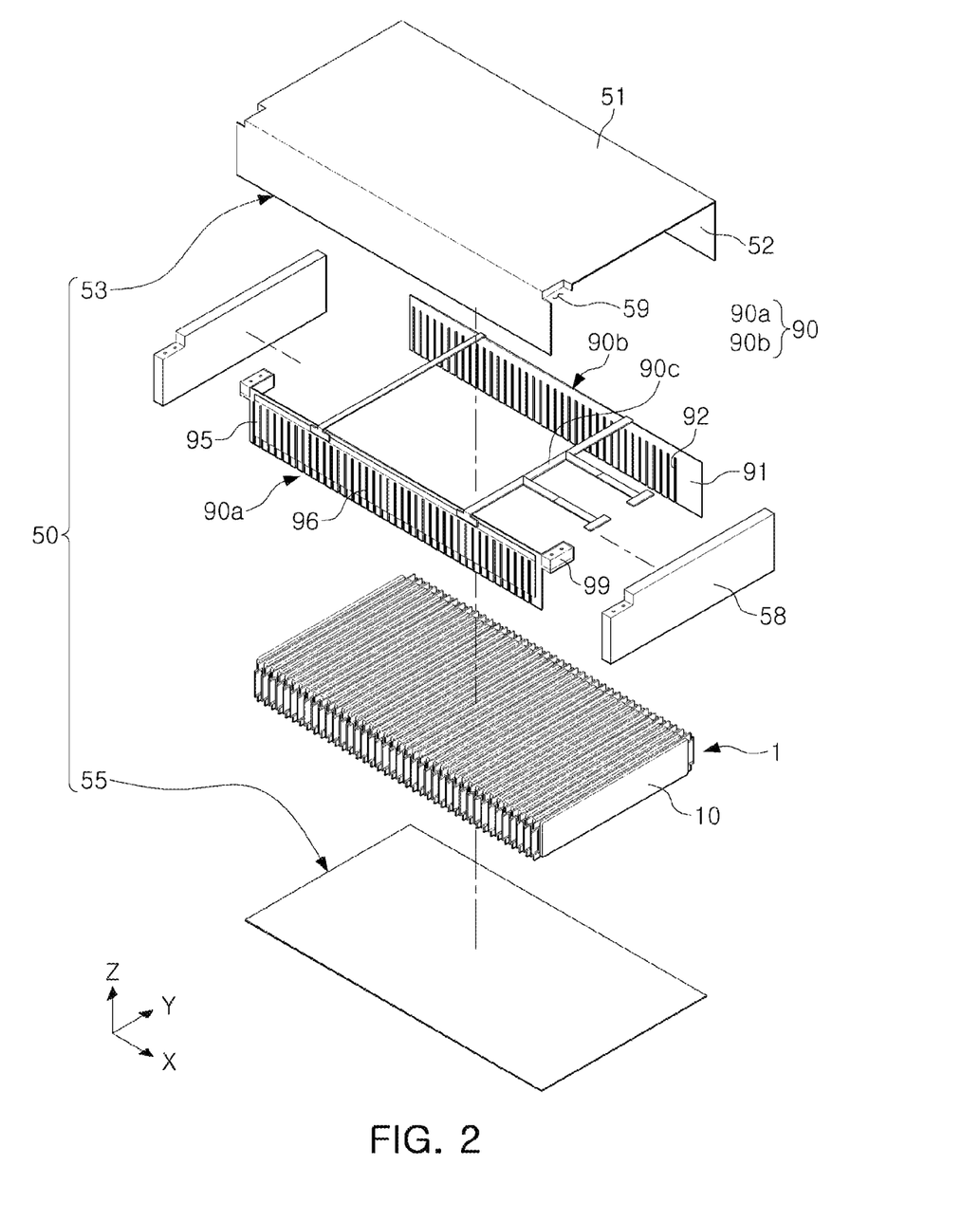
FIG. 2 is an exploded perspective view of FIG. 1.
Figure 3:
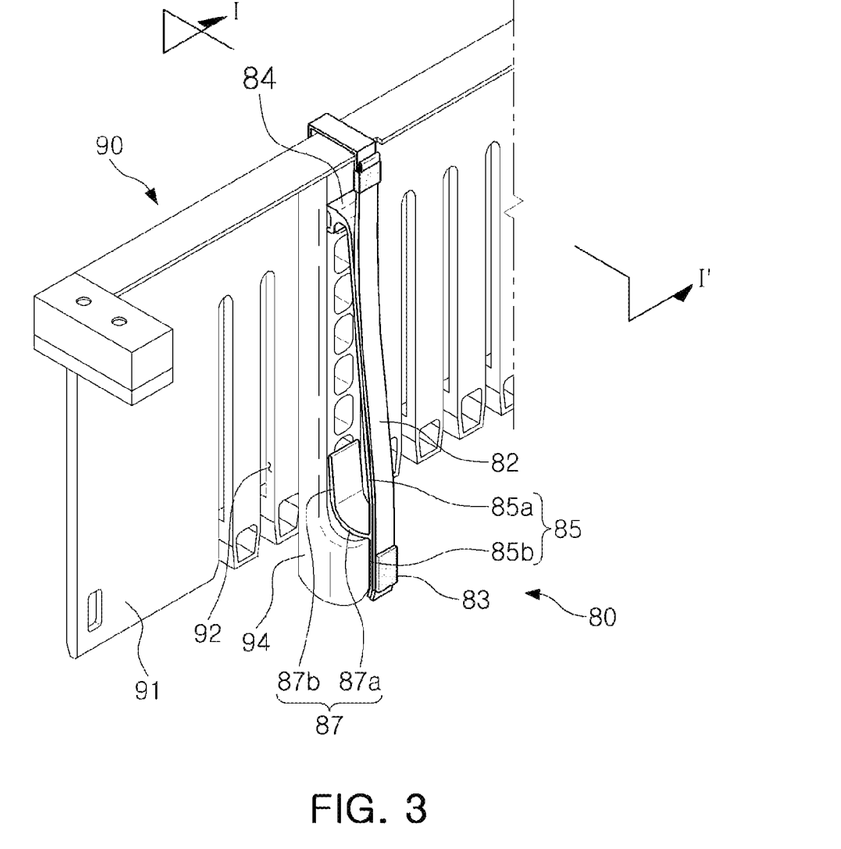
FIG. 3 is a perspective view illustrating a bus bar assembly and a sensing unit of FIG. 2.
Figure 4:
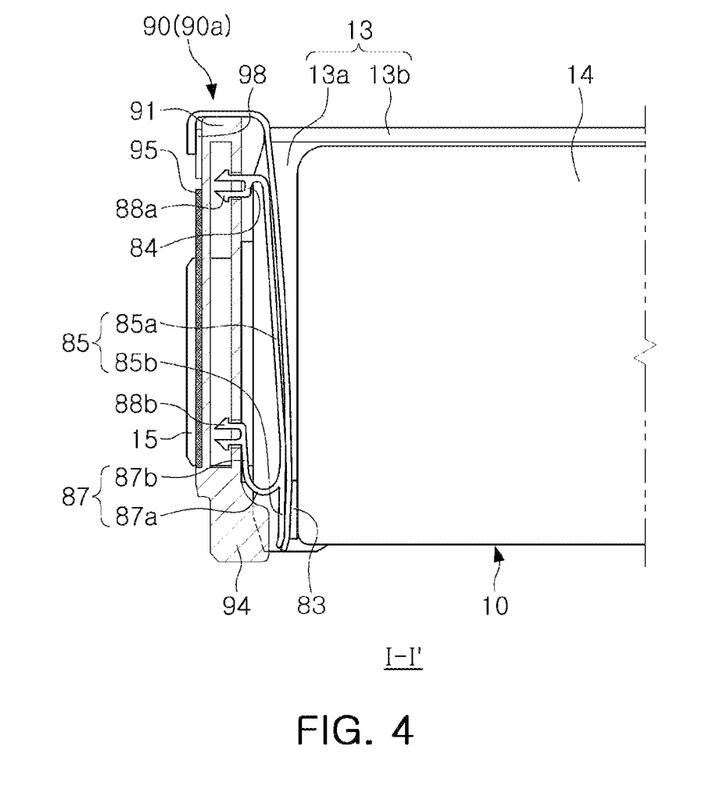
FIGS. 4 and 5 are cross-sectional views taken along line I-I' of FIG. 3.
Figure 5:
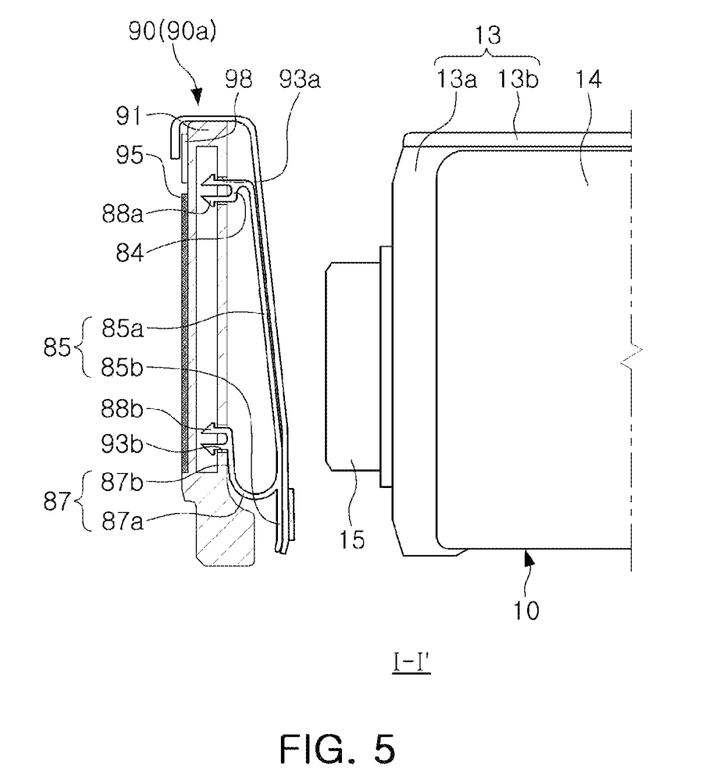

FIG. 1 is a perspective view illustrating a battery module according to an embodiment, FIG. 2 is an exploded perspective view of FIG. 1, and FIG. 3 is a perspective view illustrating a bus bar assembly and a sensing unit of FIG. 2. FIGS. 4 and 5 are cross-sectional views taken along line I-I' of FIG. 3. FIG. 4 illustrates a state of combination of a cell stack, and FIG. 5 illustrates a state in which the cell stack is separated.

Referring to FIGS. 1 to 5, a battery module 100 according to an embodiment includes a cell stack 1 in which a plurality of battery cells 10 are stacked, a bus bar assembly 90, a module case 50, and a sensing device 80 measuring the temperature of the battery cell 10.

The cell stack 1 may be formed by stacking the plurality of battery cells 10 to increase charging and discharging capacity.

The battery cell 10 may include an electrode assembly and a battery case accommodating the electrode assembly.

The battery cell 10 according to the present embodiment is a rechargeable battery capable of charging and discharging, and may include for example a lithium ion (Li-ion) battery or a nickel metal hydride (Ni-MH) battery. A nickel metal hydride battery is a secondary battery in which nickel is used for the positive electrode, a hydrogen storage alloy is used for the negative electrode, and an aqueous alkali solution is used for the electrolyte. Since the capacity per unit volume is relatively high, the nickel metal hydride battery may be used not only as an energy source for electric vehicles (EVs), hybrid vehicles (HEVs) or the like, but also may be used in various fields such as energy storage.

In the present embodiment, the battery cell 10 is formed as a pouch-type battery. However, the configuration of the present disclosure is not limited thereto, and for example, the battery cell 10 may be formed to have a prismatic shape.

Referring to FIG. 5, the battery cell 10 may include an accommodating portion 14 and a sealing portion 13.

The electrode assembly may be accommodated together with the electrolyte in the accommodating portion 14.

The overall shape of the accommodating portion 14 may be formed to have a substantially rectangular parallelepiped shape corresponding to the shape of the electrode assembly. The shape of the accommodating portion 14 may be formed by pressing and forming the exterior material of the battery cell 10. Accordingly, each corner portion of the accommodating portion 14 may be formed to have a curved shape.

The sealing portion 13 may refer to a part sealed by bonding abutting portions of the pouch of the battery cell 10. Accordingly, the sealing portion 13 is disposed around the accommodating portion 14 and may be formed in the form of a flange extending outwardly from the accommodating portion 14. A method such as thermal welding or ultrasonic welding may be used for bonding the sealing portion 13, but the method is not limited thereto.

In this embodiment, the sealing portion 13 may be divided into a first sealing portion 13a in which an electrode lead 15 is disposed, and a second sealing portion 13b in which the electrode lead 15 is not disposed.

In addition, in this embodiment, two electrode leads 15 may be disposed to be directed in opposite directions. However, the configuration of the present disclosure is not limited thereto, and various modifications are possible as needed, such as disposing the two electrode leads 15 in the same direction.

The plurality of battery cells 10 may be stacked in parallel such that relatively wide surfaces compared to the other surfaces face each other. For example, the battery cells 10 may be vertically erected and stacked in a lateral direction (or a horizontal direction). However, the present disclosure is not limited thereto, and the plurality of battery cells 10 may also be configured to be stacked in the vertical direction.

The bus bar assembly 90 may be coupled to a side of the cell stack 1 on which the electrode leads 15 of the battery cell 10 are disposed, among sides of the cell stack 1.

The bus bar assembly 90 of this embodiment may include an insulating cover 91 and a bus bar 95.

The electrode leads 15 of the battery cells 10 may pass through the insulating cover 91 to be interconnected outside the insulating cover 91. To this end, a plurality of first slits 92 into which the electrode leads 15 are inserted may be provided in the insulating cover 91.

In addition, the insulating cover 91 may be provided with a connection terminal 99 for electrically connecting the battery cells 10 to an external source. The connection terminal 99 may be exposed externally through a terminal hole 59 formed in the module case 50. Accordingly, the terminal hole 59 of the module case 50 may be formed to have a shape corresponding to the size and outer shape of the connection terminal 99.

In the present embodiment, the connection terminal 99 is formed of a conductive member and may be electrically connected to at least one bus bar 95.

The bus bar 95 may be formed in the form of a metal plate and coupled to the external surface of the insulating cover 91, or may be configured such that at least a portion thereof is embedded in the insulating cover 91. The battery cells 10 may be electrically connected to each other through the bus bar 95, and may be electrically connected to an external element of the battery module 100 through the bus bar 95 and the connection terminal 99. As illustrated in FIG. 2, the bus bar 95 connects to each battery cell 10 along a vertical direction and may extend along a horizontal direction to connect to the connection terminal 99.

To this end, a plurality of second slits 96 into which the electrode leads 15 are inserted may be provided in the bus bar 95. The second slits 96 may be disposed in positions corresponding to the first slits 92. Accordingly, the electrode leads 15 may be inserted and disposed in the bus bar assembly 90 to pass through the first slits 92 and the second slits 96 together. To this end, the plurality of first slits 92 and second slits 96 which correspond to the number of the battery cells 10 may be disposed spaced apart from each other in parallel.

After the electrode leads 15 are inserted into the second slits 96 of the bus bar 95, the electrode leads 15 may be joined to the bus bar 95 through welding or the like.

The bus bar assembly 90 of the present embodiment may be coupled to the cell stack 1 in a vertical direction (e.g., a Z-axis direction). To this end, the first slit 92 and the second slit 96 may be formed such that an external opening in the slits extends through the lower portion of the bus bar assembly 90.

For example, based on the Z-axis direction of FIG. 2, the first slit 92 and the second slit 96 may be formed to have an open lower portion, and thus, the electrode leads 15 may be simultaneously inserted into the first slit 92 and the second slit 96 through the lower portion of the bus bar assembly 90.

In addition, the insulating cover 91 of the bus bar assembly 90 may be provided with a coupling portion 94 to which the sensing device 80 to be described later is coupled.

The coupling portion 94 may be disposed on one surface of the insulating cover 91, facing the battery cell 10, among both surfaces of the insulating cover 91, and a plurality of the coupling portions 94 may be disposed to be spaced apart from each other by a predetermined distance.

An elastic bracket 81 to be described later in reference to FIG. 6 may be coupled to the coupling portion 94. Accordingly, the coupling portion 94 may be formed to have a shape corresponding to the shape of the elastic bracket 81, and may include a first coupling groove 93a and a second coupling groove 93b as shown in FIG. 5.

A first locking protrusion 88a of the elastic bracket 81 may be inserted into the first coupling groove 93a, and a second locking protrusion 88b may be inserted into the second coupling groove 93b. Therefore, the first coupling groove 93a and the second coupling groove 93b may be formed in positions corresponding to the first locking protrusion 88a and the second locking protrusion 88b, respectively, and may be formed as grooves having a size into which the first locking protrusion 88a and the second locking protrusion 88b may be inserted.

The space of the first coupling groove 93a may be expanded inside the insulating cover 91 as a fixing portion 84 is inserted. Accordingly, the fixing portion 84 may be elastically deformed by external force as it is inserted into the first coupling groove 93a, with the shape of the fixing portion 84 restored after being inserted. See for example the shape of the fixing portion 84 illustrated in FIG. 6. In this manner, the first locking protrusion 88a may not be easily separated from the insulating cover 91 by being supported by a step formed on the inlet portion of the first coupling groove 93a.

The second coupling groove 93b and the second locking protrusion 88b may be formed and coupled to each other, similarly to the above-described first coupling groove 93a and first locking protrusion 88a. However, the present disclosure is not limited thereto.

The bus bar assembly 90 may include circuitry 98 as shown in FIGS. 4 and 5. The circuitry 98 may include a circuit board (e.g., a printed circuit board (PCB)) and a plurality of electronic devices mounted on the circuit board, and may be coupled to one side of the bus bar assembly 90 to perform a function of sensing temperature or voltage of the battery cell 10. Accordingly, the circuitry 98 may be electrically connected to a temperature sensor 83 of the sensing device 80 providing a battery module temperature monitor.

In this embodiment, the circuitry 98 may be coupled to the outer surface of the bus bar assembly 90. However, the present disclosure is not limited thereto, and the circuitry 98 may be disposed in various positions as needed.

Also, as illustrated in FIG. 2, the bus bar assembly 90 of this embodiment may include a first bus bar assembly 90a and a second bus bar assembly 90b.

The first bus bar assembly 90a may be coupled to one side of the cell stack 1, and the second bus bar assembly 90b may be coupled to the other side of the cell stack 1. In this case, one side and the other side of the cell stack 1 refer to both sides of the cell stack 1 on which the electrode leads 15 are disposed.

In this case, the first bus bar assembly 90a and the second bus bar assembly 90b may be connected by a connection member 90c. For example, both ends of the connection member 90c are coupled to the circuitry 98 coupled to the first bus bar assembly 90a and the circuitry 98 coupled to the second bus bar assembly 90b, respectively, to electrically and physically connect the first bus bar assembly 90a and the second bus bar assembly 90b to each other.

A flexible printed circuit board (FPCB) may be used as the connection member 90c. However, the present disclosure is not limited thereto, and various types of boards may be used as long as circuit wirings are formed thereon.

The connection member 90c may be provided as one or more connection members, and when the bus bar assembly 90 is coupled to the cell stack 1, the connection member 90c may be disposed on the cell stack 1.

As such, when the bus bar assembly 90 includes the first bus bar assembly 90a and the second bus bar assembly 90b, the first bus bar assembly 90a and the second bus bar assembly 90b may be coupled to the cell stack 1 at the same time on both sides of the cell stack 1.

The sensing device 80 may be coupled to the bus bar assembly 90 to perform a function of sensing the temperature of the battery cell 10.

The sensing device 80 of this embodiment may be disposed between the bus bar 95 and the battery cell 10 and may be fixedly coupled to the insulating cover 91.

Figure 6:
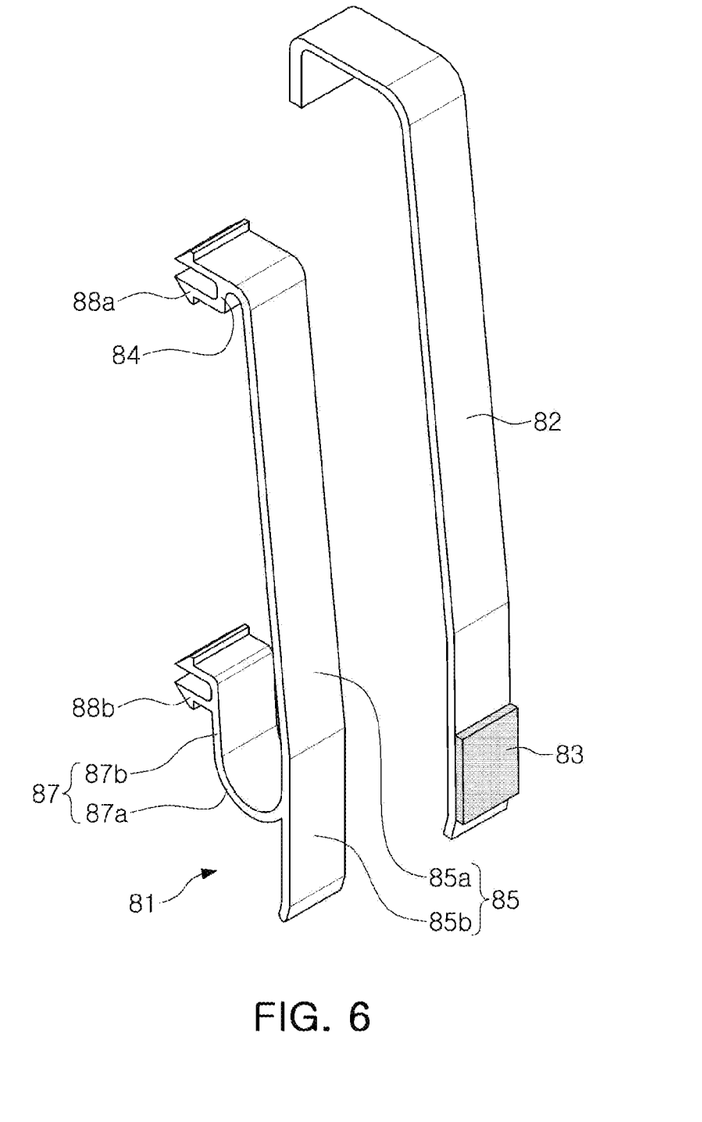
FIG. 6 is an exploded perspective view of the sensing unit illustrated in FIG. 3.

FIG. 6 is an exploded perspective view of the sensing unit illustrated in FIG. 3. Referring to FIGS. 3 and 6 together, the sensing device 80 of this embodiment may include a connection substrate 82, and an elastic bracket 81 supporting the connection substrate 82.

A temperature sensor 83 may be mounted on one end of the connection substrate 82. The connection substrate 82 electrically connects the circuitry 98 and the temperature sensor 83, and to this end, the other end of the connection substrate 82 may be connected to the circuitry 98.

As the connection substrate 82, a flexible printed circuit board (FPCB) may be used. However, the present disclosure is not limited thereto, and various types of substrates may be used as long as the circuit wiring is formed thereon.

One surface of the connection substrate 82 may be bonded to a support member 85 of the elastic bracket 81 to be supported by the elastic bracket 81.

The elastic bracket 81 may be coupled to the insulating cover 91 to press the temperature sensor 83 toward the battery cell 10. To this end, the elastic bracket 81 may include the support member 85, a fixing portion 84, and an elastic reinforcing portion 87.

The support member 85 may be formed to have a flat and long rod shape. The connection substrate 82 and the temperature sensor 83 may be disposed on one surface thereof. Accordingly, the width of the support member 85 may be greater than or equal to the width of the connection substrate 82.

The fixing portion 84 may be provided on one end of the support member 85.

The fixing portion 84 is a part for fixing and fastening the elastic bracket 81 to the insulating cover 91. To this end, the fixing portion 84 may be provided with the first locking protrusion 88a fitted to the insulating cover 91.

As the first locking protrusion 88a, two locking protrusions may be spaced apart from each other by a predetermined distance, and may be inserted into the first coupling groove 93a of the insulating cover 91. Accordingly, the two first locking protrusions 88a are spaced apart from each other by a distance capable of being inserted into the first coupling groove 93a, and may be disposed in such a manner that the locking protrusions protrude in opposite directions. Also, an empty space may be formed between the two first locking protrusions 88a.

When the first locking protrusion 88a is inserted into the first coupling groove 93a, the first locking protrusion 88a may be disposed such that the protrusion portion is caught on an inlet side step of the first coupling groove 93a. Therefore, the fixing portion 84 is elastically deformed by external force and may be fitted into the first coupling groove 93a. However, the configuration of the present disclosure is not limited thereto, and various modifications are possible as long as the fixing portion 84 may be fixed and fastened to the insulating cover 91 by using a separate fixing member such as a screw or an adhesive.

As one end of the support member 85 is fixed to the insulating cover 91 through the fixing portion 84, the support member 85 may be fixedly coupled to the bus bar assembly 90 in the form of a cantilever. Accordingly, when the support member 85 is elastically deformed by external force, the support member 85 may provide a restoring force in a direction opposite to the external force.

The elastic reinforcing portion 87 may be disposed in a location spaced apart from the fixing portion 84 by a predetermined distance, may be elastically deformed, and reinforce the elastic force of the support member 85. To this end, the elastic reinforcing portion 87 is formed on the other surface of the support member 85, and may be disposed in such a manner that at least a portion thereof is in contact with the bus bar assembly 90.

The elastic reinforcing portion 87 of the present embodiment may be elastically deformed when the support member 85 is pressed toward the insulating cover 91, and may press the support member 85 toward the battery cell 10 through a restoring force.

In detail, when the bus bar assembly 90 (to which the elastic bracket 81 is coupled) is coupled to the cell stack 1, the elastic reinforcing portion 87 is pressed by the battery cell 10 to be elastically deformed. In this case, a restoring force may be generated in the elastic reinforcing portion 87. Accordingly, the temperature sensor 83 of the present embodiment may be firmly disposed in close contact with the battery cell 10 through the restoring force of the support member 85 and the restoring force of the elastic reinforcing portion 87.

To this end, the elastic reinforcing portion 87 may include a bending portion 87*a* extending from the other surface of the support member 85 in a curved shape, and a contact portion 87*b* extending from the bending portion 87*a* and partially in contact with the insulating cover 91. In the case of the elastic reinforcing portion 87, the bending portion 87*a* may be elastically deformed by an external force, and the temperature sensor 83 may be pressed toward the battery cell 10 through the restoring force of the bending portion 87*a*.

In the elastic bracket 81 of this embodiment, the contact portion 87*b* may also be coupled to the insulating cover 91. To this end, the contact portion 87*b* may be provided with the second locking protrusion 88*b*. The second locking protrusion 88*b* may be formed to protrude from one surface of the contact portion 87*b*. In the corresponding insulating cover 91, the second coupling groove 93*b* may be provided into which the second locking protrusion 88*b* of the contact portion 87*b* is inserted. However, the configuration of the present disclosure is not limited thereto, and as long as the contact portion 87*b* may be fixed to the insulating cover 91, the configuration may be modified in various forms. In addition, in a case in which the fixing portion 84 is firmly fixed to the insulating cover 91, the second locking protrusion 88*b* may be omitted.

The elastic bracket 81 configured as described above may be disposed in a region between the first slits 92 and coupled to the insulating cover 91. Also, a plurality of elastic brackets may be spaced apart and coupled to the insulating cover 91.

The temperature sensor 83 may be disposed on the end of the support member 85. In detail, the support member 85 of the present embodiment may include a substrate support portion 85*a* that is a section connecting the fixing portion 84 and the elastic reinforcing portion 87, and a sensor support portion 85*b* disposed to protrude to the outside of the elastic reinforcing portion 87. Further, the temperature sensor 83 may be disposed on one surface of the sensor support portion 85*b*.

Since the elastic bracket 81 is disposed in the region between the first slits 92 as shown in FIG. 3, the temperature sensor 83 may be disposed to contact the accommodating portion 14 of the battery cell 10, as shown in FIG. 4. In detail, the temperature sensor 83 of the present embodiment may be disposed to contact the narrow side of accommodating portion 14 on which the electrode lead 15 is disposed, not the wide surface of the accommodating portion 14 extending in the Y-Z plane, among several surfaces of the accommodating portion 14 in which the electrode assembly and the electrolyte are accommodated.

The sensing device 80 as described above may be provided as a plurality of the sensing units, which may be spaced apart from each other by a predetermined distance and be dispersedly disposed in the first bus bar assembly 90*a* and the second bus bar assembly 90*b*.

The module case 50 defines the external appearance of the battery module 100, and may be disposed outside of the plurality of battery cells 10 to protect the battery cells 10 from an external environment.

The module case 50 as illustrated in FIG. 2 may include a lower case 55 disposed below the cell stack 1, and an upper case 53 disposed above the cell stack 1, while surrounding the cell stack 1, and side covers 58 disposed on the sides of the cell stack 1.

The upper case 53 may include an upper plate 51 and side plates 52 supporting side surfaces of the cell stack 1. In this embodiment, the side plates 52 and the upper plate 51 may be integrally configured. However, the present disclosure is not limited thereto, and the side plates 52 and the upper plate 51 may also be configured as independent components as needed.

The side plates 52 may be formed to extend from both sides of the upper plate 51 to be disposed on both sides of the cell stack 1. As illustrated in FIG. 2, in the present embodiment, the battery cells 10 may be disposed such that the electrode lead 15 faces the side plate 52. Accordingly, the bus bar assembly 90 electrically connected to the electrode leads 15 may be disposed between the side plate 52 and the battery cell 10.

The upper case 53 may be formed of a material having high thermal conductivity, such as metal. For example, the upper case 53 may be formed of an aluminum material. However, the present disclosure is not limited thereto, and various materials may be used as long as the material has similar strength and thermal conductivity, even if the material is not a metal.

The lower case 55 may be disposed below the cell stack 1 to support lower surfaces of the battery cells 10. The lowercase 55 may be fastened to the lower ends of the side plates 52 of the upper case 53. When the lower case 55 is fastened to the upper case 53, the upper case 53 and the lower case 55 may have the shape of a hollow tubular member.

Like the upper case 53, the lower case 55 may be formed of a material having relatively high thermal conductivity, such as metal. For example, the lower case 55 may be formed of the same material as the upper case 53, but the configuration is not limited thereto.

The upper case 53 and the lowercase 55 may be coupled using a fixing member such as a bolt or screw. However, the present disclosure is not limited thereto, and various modifications such as coupling by a sliding method or joining by a method such as welding are possible.

Side covers 58 may be coupled to both ends of the tubular member provided by coupling the upper case 53 and the lower case 55 to each other.

The side cover 58 and upper plate 51 may be provided with a terminal hole 59 exposing the connection terminal 99, and may be formed of a material having rigidity. For example, the side cover 58 may be formed of an insulating material such as a resin or a conductive material such as metal.

The side cover 58 may be coupled to the lower case 55 and the upper case 53 through a fixing member such as a bolt or a screw, adhesive welding or the like, but the coupling member is not limited thereto.

Next, a method of manufacturing (assembling) the battery module 100 according to the present embodiment will be described.

Figure 7:
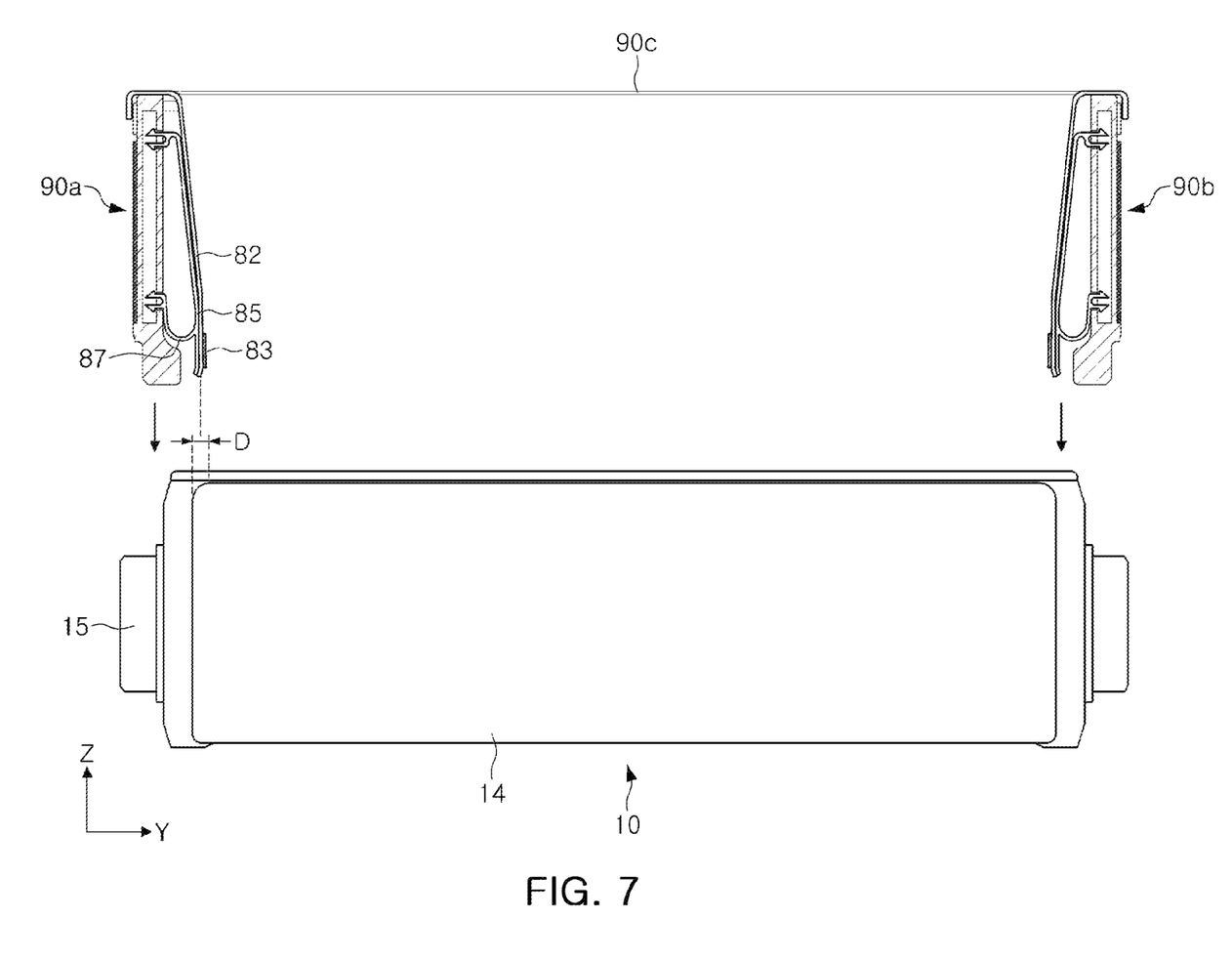
FIGS. 7 and 8 are views illustrating a method of manufacturing the battery module illustrated in FIG. 1.
Figure 8:
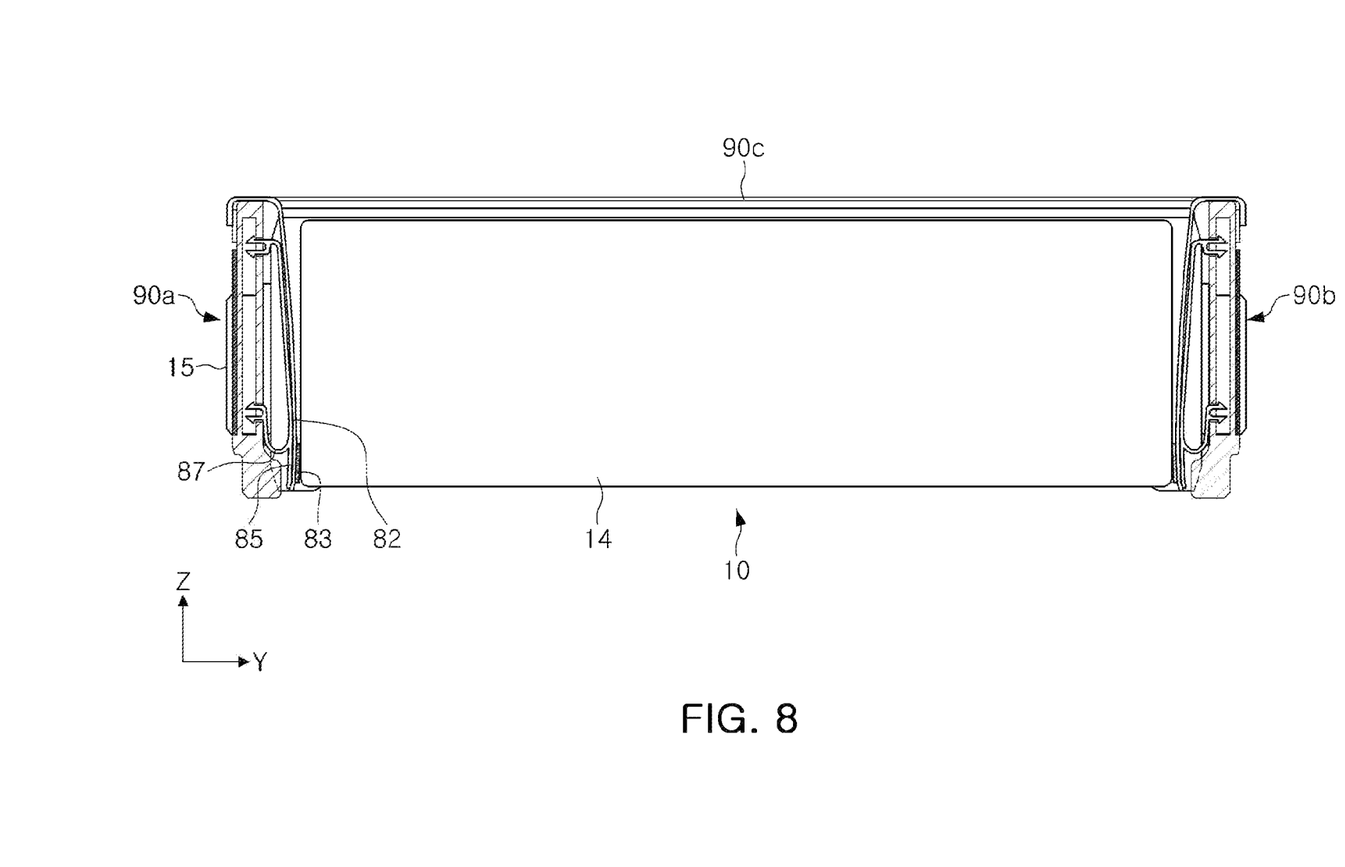

FIGS. 7 and 8 are views illustrating a method of manufacturing the battery module illustrated in FIG. 1, and only illustrate the battery cell 10, the bus bar assembly 90, and the sensing device 80 for convenience of description.

In the method of manufacturing a battery module according to this embodiment, as illustrated in FIG. 2, first, the battery cells 10 are stacked to form the cell stack 1, and then, the side covers 58 are disposed on both sides of the cell stack 1.

Then, the bus bar assembly 90 of this embodiment is coupled to the cell stack 1.

In this operation, the bus bar assembly 90 may be coupled to the cell stack 1 while descending in the Z-axis direction from the top to the bottom.

In this operation, a process of locating the bus bar assembly 90 on the cell stack 1 may first be performed.

As illustrated in FIG. 7, in this process, the elastic bracket 81 may be disposed in such a manner that the end (on which the temperature sensor 83 is disposed) is located on the upper portion of the accommodating portion 14 to be located within a curved surface range (D) of a corner of the accommodating portion 14.

If the end of the elastic bracket 81 excessively protrudes toward the battery cell 10 outside the above range, interference may occur between the elastic bracket 81 and the accommodating portion 14 of the battery cell 10 in the coupling process to be described later.

Conversely, if the end of the elastic bracket 81 is not positioned on an upper portion of the accommodating portion 14 of the battery cell 10, the temperature sensor 83 may not come into contact with the accommodating portion 14 of the battery cell 10 even in the case in which the bus bar assembly 90 is coupled to the cell stack 1, and thus, it may be difficult to accurately measure the temperature.

Next, a process of lowering the bus bar assembly 90 in the downward direction to couple the bus bar assembly 90 to the cell stack 1 may be performed. In this process, the bus bar assembly 90 may slide downwardly in the Z-axis direction, and the electrode leads 15 of the battery cell 10 may be simultaneously inserted in the first slit 92 and the second slit 96 and may be coupled to the bus bar assembly 90.

Also, as illustrated in FIG. 8, in this process, the end of the support member 85 may be elastically deformed as the temperature sensor 83 slides along the curved surface of the corner of the accommodating portion 14 to be pressed toward the insulating cover 91. As a result, a restoring force is generated in the support member 85 and the elastic reinforcing portion 87, and the temperature sensor 83 may be pressed toward the battery cell 10 by the restoring force and may be in close contact with the accommodating portion 14.

When the bus bar assembly 90 is completely coupled to the cell stack 1, the electrode lead 15 may be fixedly coupled to the bus bar 95 through a method such as welding.

Thereafter, the battery module 100 may be completed by coupling the module case 50 to the cell stack 1 to which the bus bar assembly 90 is coupled.

In the battery module 100 of this embodiment configured as described above, the sensing device 80 is fixedly coupled to the bus bar assembly 90. Accordingly, the temperature sensor 83 may be brought into close contact with the battery cell 10 only through the process of bonding the bus bar assembly 90 to the cell stack 1 without other additional manufacturing steps to secure the temperature sensor in position, thereby facilitating manufacturing of the battery module and/or installation of a battery module temperature monitor.

In addition, the bus bar assembly 90 descends in the Z-axis direction from the top to the bottom, and even when coupled to the cell stack 1, the temperature sensor (or the battery module temperature monitor) 83 may firmly adhere to the battery cell 10 by the elastic frame, thereby enabling accurate temperature measurement.

As set forth above, in a battery module according to one embodiment of the invention, a sensing device is integrally coupled to a bus bar assembly. Therefore, a temperature sensor may be brought into close contact with the battery cell only through the process of bonding the bus bar assembly to a cell stack, thereby facilitating the manufacturing. In addition, since the temperature sensor (or the battery module temperature monitor) is disposed in close contact with an accommodating portion of the battery cell by an elastic frame, accurate temperature may be measured.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is not limited to the detailed description, but includes all variations and their equivalents.

What is claimed is:

1. A battery module comprising:
   a cell stack including a plurality of battery cells stacked therein;
   a bus bar assembly coupled to a side of the cell stack, on which an electrode lead of the battery cell is disposed; and
   a sensing device coupled to the bus bar assembly and measuring a temperature of the battery cell,
   wherein
   the sensing device includes a temperature sensor disposed in contact with the battery cell, and an elastic bracket pressing the temperature sensor to contact with the battery cell through elastic force,
   the bus bar assembly is configured to be coupled to the cell stack in a first direction, and the elastic bracket is configured to press the temperature sensor in a second direction perpendicular to the first direction.

2. The battery module of claim 1, wherein the elastic bracket comprises,
a support member having a rod shape and having a first surface on which the temperature sensor is disposed; and
a fixing portion fixing and fastening one end of the support member to the bus bar assembly in cantilever form.

3. The battery module of claim 2, wherein the fixing portion comprises a locking protrusion fitted into a coupling groove disposed in the bus bar assembly.

4. The battery module of claim 2, wherein the elastic bracket further comprises an elastic reinforcing portion disposed on a second surface of the support member, at least a portion of the elastic reinforcing portion being in contact with the bus bar assembly and elastically deformed to reinforce the elastic force of the support member.

5. The battery module of claim 4, wherein the elastic reinforcing portion comprises a bending portion extending in a curved shape from the second surface of the support member, and a contact portion extending from the bending portion and partially in contact with the bus bar assembly.

6. The battery module of claim 5, wherein the elastic bracket further comprises a locking protrusion protruding from the contact portion and inserted into the bus bar assembly.

7. The battery module of claim 2, further comprising:
a circuitry coupled to the bus bar assembly; and
a connection substrate disposed on one surface of the support member and electrically connecting the temperature sensor and the circuitry.

8. The battery module of claim 1, wherein the sensing unit is provided as a plurality of sensing units spaced apart from each other.

9. The battery module of claim 1, wherein the bus bar assembly comprises,
an insulating cover having a first slit into which the electrode lead is inserted; and
a bus bar fastened to one surface of the insulating cover and having a second slit into which the electrode lead is also inserted.

10. The battery module of claim 9, wherein the first slit and the second slit are configured to be connected externally through a lower portion of the bus bar assembly, and
the electrode lead is simultaneously insertable into the first slit and the second slit through the lower portion of the bus bar assembly.

11. The battery module of claim 9, wherein the first slit is provided as a plurality of first slits spaced apart from each other in parallel, and
the elastic bracket is disposed between the first slits and coupled to the insulating cover.

12. The battery module of claim 1, wherein the battery cell has an accommodating portion in which the electrode assembly is accommodated, and the temperature sensor is disposed to contact one surface of the accommodating portion, on which the electrode lead is disposed.

13. The battery module of claim 2, wherein when the bus bar assembly is coupled to the cell stack, the support member is elastically deformed by the battery cell and is pressed toward the bus bar assembly.

14. The battery module of claim 1, wherein the bus bar assembly comprises,
a first bus bar assembly coupled to one side of the cell stack;
a second bus bar assembly coupled to the other side of the cell stack; and
a connection member connecting the first bus bar assembly and the second bus bar assembly,
wherein the first bus bar assembly and the second bus bar assembly are simultaneously coupled to the cell stack.

15. The battery module of claim 1, wherein at least one of the battery cells includes an accommodating portion containing electrolyte, and the temperature sensor is pressed against the accommodating portion.

16. The battery module of claim 15, wherein the accommodating portion includes a curved section at a corner of the accommodating portion.

17. The battery module of claim 16, wherein, during assembly of the battery module, the temperature sensor slides along the curved section of the accommodating portion in order to provide an external force to the elastic bracket for pressing the temperature sensor toward the battery cell and into contact with the accommodating portion.

18. The battery module of claim 17, wherein, after assembly of the battery module, the temperature sensor is pressed into contact with the battery cell without additional manufacturing steps to secure the temperature sensor in position.

19. A battery module temperature monitor comprising:
a sensing device configured to be coupled to a bus bar assembly connected to a cell stack including a plurality of battery cells;
a temperature sensor included with the sensing device; and
an elastic bracket configured to be supported by the bus bar assembly and connected to the temperature sensor, wherein
at least one of the battery cells includes an accommodating portion containing electrolyte, and the temperature sensor when installed is pressed by the elastic member against the accommodating portion,
the bus bar assembly is configured to be coupled to the cell stack in a first direction, and
the elastic bracket is configured to press the temperature sensor in a second direction perpendicular to the first direction.

20. The battery module temperature monitor of claim 19, wherein the temperature sensor is configured to slide along a curved section of the accommodating portion during installation of the battery monitor in order to provide an external force to the elastic bracket for pressing the temperature sensor into contact with the accommodating portion.

* * * * *